US010998001B1

(12) United States Patent
Varnica et al.

(10) Patent No.: US 10,998,001 B1
(45) Date of Patent: May 4, 2021

(54) INTERLEAVER FOR DISTRIBUTED SECTOR STORAGE

(71) Applicant: Marvell Asia Pte, Ltd., Singapore (SG)

(72) Inventors: Nedeljko Varnica, San Jose, CA (US); Mats Oberg, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/948,877

(22) Filed: Oct. 5, 2020

Related U.S. Application Data

(60) Provisional application No. 62/912,495, filed on Oct. 8, 2019.

(51) Int. Cl.
*G11B 20/12* (2006.01)

(52) U.S. Cl.
CPC .. *G11B 20/1217* (2013.01); *G11B 2020/1232* (2013.01)

(58) Field of Classification Search
CPC ..... G11B 20/12; G11B 20/16; G11B 20/1407; G11B 20/1205; G11B 20/1209
USPC .......................................... 360/40, 48, 41, 50
See application file for complete search history.

(56) References Cited

U.S. PATENT DOCUMENTS 8,699,185 B1 * 4/2014 Teh ........................ G11B 5/012
360/135

* cited by examiner

*Primary Examiner* — Nabil Z Hindi

(57) ABSTRACT

A method for storing data in groups of logical data sectors across a plurality of contiguous data tracks of a data storage medium includes defining a plurality of interleaver patterns, each interleaver pattern including a sector interleaving pattern specifying a respective order in which segments of respective ones of the logical data sectors are spread across physical data sectors of a respective one of the contiguous data tracks. For each respective group of logical data sectors, a respective interleaver pattern is selected. Data is written from each group of logical data sectors to one of the data tracks using the selected interleaver pattern. Each respective group of logical data sectors is written to its respective data track using a different interleaver pattern from any other group of logical data sectors written to an adjacent data track, so that no two adjacent data tracks are written using the same interleaver pattern.

28 Claims, 9 Drawing Sheets

INTERLEAVER FOR DISTRIBUTED SECTOR STORAGE

CROSS REFERENCE TO RELATED APPLICATION

This disclosure claims the benefit of commonly-assigned U.S. Provisional Patent Application No. 62/912,495, filed Oct. 8, 2019, which is hereby incorporated by reference herein in its entirety.

FIELD OF USE

This disclosure relates to interleavers in mass-storage devices (e.g., disk drives) that store logical data sectors in a distributed manner across multiple physical sectors. More particularly, this disclosure relates to such interleavers that use different interleaving patterns on adjacent tracks to minimize inter-track interference.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter. Data recorded at different radial positions of each head are referred to "tracks" of data.

Data on adjacent tracks may or may not be independent of one another. As areal densities for magnetic data storage continue to increase, reading may be performed using read heads or sensors having dimensions comparable to the track width. Therefore, it is important to be able to distinguish data on one track from data on another track, despite "inter-track interference."

SUMMARY

A method according to implementations of this disclosure for storing data in a plurality of groups of logical data sectors, each respective group of logical data sectors including a respective number of logical data sectors, across a plurality of contiguous data tracks of a data storage medium, includes defining a plurality of interleaver patterns, each interleaver pattern including a sector interleaving pattern specifying a respective order in which segments of respective ones of the logical data sectors are spread across physical data sectors of a respective one of the plurality of contiguous data tracks, selecting, for each respective group of logical data sectors, a respective interleaver pattern from the plurality of interleaver patterns, and writing data from each respective group of logical data sectors to one of the data tracks in the plurality of contiguous data tracks using the selected interleaver pattern, each respective group of logical data sectors being written to its respective data track using a different one of the plurality of interleaver patterns from any other group of logical data sectors written to a data track adjacent to the respective data track, so that no two adjacent data tracks are written using the same interleaver pattern.

In a first implementation of such a method, the selecting a respective interleaver pattern may include selecting a respective sector interleaving pattern for each respective group of logical data sectors so that for any two respective groups of logical data sectors stored on two adjacent data tracks, each logical data sector on a first one of the two adjacent data tracks has (1) at least a first segment that is adjacent a segment of a first logical sector on a second one of the two adjacent data tracks and (2) at least a second segment that is adjacent a segment of a second logical sector on the second one of the two adjacent data tracks, and the writing includes distributing the respective number of logical data sectors in each respective group of logical data sectors across a respective group of physical data sectors on a respective single data track of the data storage medium.

In a first instance of the first implementation, when a number of segments per sector is equal to the respective number of logical data sectors, the distributing may include, for each respective group of logical data sectors, distributing each segment of each logical data sector into a physical data sector of the respective single data track according to the selected sector interleaving pattern, each physical data sector receiving at most one segment from each logical data sector.

In a second instance of the first implementation, in the selecting, no sector in the first respective group of logical data sectors on the first one of the two adjacent data tracks has more than one segment adjacent to segments of any single logical data sector in the second respective group of logical data sectors on the second one of the two adjacent data tracks.

In a first variant of that second instance, segments may be arranged within the logical data sectors according to a segment interleaving pattern, where in the first group of logical data sectors on the first one of the two adjacent data tracks, the segments are arranged in a first predetermined order, in one physical sector on the second one of the two adjacent data tracks, the segments are arranged in the first predetermined order, and in each respective physical sector on the second one of the two adjacent data tracks, the segments are arranged in a respective order that is cyclically shifted from the respective order in an adjacent other respective physical sector on the second one of the two adjacent data tracks.

In that first variant, the first predetermined order may be natural order of the logical data sectors.

In that first variant, each respective group of logical data sectors may include a same number of logical data sectors and is distributed over the same number of physical data sectors on its respective one of the two adjacent data tracks.

In a second variant of that second instance, the first group of logical data sectors on the first one of the two adjacent data tracks may include a first number of logical data sectors, the second group of logical data sectors on the second one of the two adjacent data tracks may include a second number of logical data sectors, the second number being different from the first number and other than an integer multiple of the first number, in the first group of logical data sectors on the first one of the two adjacent data tracks, the segments may be arranged in a first predetermined order, and in the second group of logical data sectors on the second one of the two adjacent data tracks, the segments may be arranged in the first predetermined order. In that second variant, the first predetermined order may be natural order.

In a third instance of the first implementation all logical data sectors and all physical data sectors may be of a uniform sector size.

In a fourth instance of the first implementation all physical data sectors may be of a uniform sector size. In a first variant of that fourth instance, all segments of each logical data sector may be of a uniform segment size. In a second variant of that fourth instance of the first implementation, at least one respective segment of each respective logical data sector may be of a different segment size than all other segments of the respective logical data sector. In that second variant, the at least one respective segment of the different segment size may be in a uniform location in each respective logical data sector. Alternatively, in that second variant, the at least one respective segment of the different segment size may be in a different location in each respective logical data sector.

A data storage device according to implementations of the subject matter of this disclosure includes a data storage medium and a controller configured to store data in a plurality of groups of logical data sectors, each respective group of logical data sectors including a respective number of logical data sectors, across a plurality of contiguous data tracks of the data storage medium, by defining a plurality of interleaver patterns, each interleaver pattern including a sector interleaving pattern specifying a respective order in which segments of respective ones of the logical data sectors are spread across physical data sectors of a respective one of the plurality of contiguous data tracks, selecting, for each respective group of logical data sectors, a respective interleaver pattern from the plurality of interleaver patterns, and writing data from each respective group of logical data sectors to one of the data tracks in the plurality of contiguous data tracks using the selected interleaver pattern, each respective group of logical data sectors being written to its respective data track using a different one of the plurality of interleaver patterns from any other group of logical data sectors written to a data track adjacent to the respective data track.

In a first implementation of such a data storage device, the controller may be configured to select a respective interleaving pattern for each respective group of logical data sectors so that for any two respective groups of logical data sectors stored on two adjacent data tracks, each logical data sector on a first one of the two adjacent data tracks has (1) at least a first segment that is adjacent a segment of a first logical sector on a second one of the two adjacent data tracks and (2) at least a second segment that is adjacent a segment of a second logical sector on the second one of the two adjacent data tracks, and distribute the respective number of logical data sectors in each respective group of logical data sectors across a respective group of physical data sectors on a respective single data track of the data storage medium.

In a first instance of the first implementation, when a number of segments per sector is equal to the respective number of logical data sectors, the controller may be configured to, for each respective group of logical data sectors, distribute each segment of each logical data sector into a physical data sector of the respective single data track according to the selected interleaving pattern, each physical data sector receiving at most one segment from each logical data sector.

In a second instance of the first implementation, the controller may be configured to select the respective interleaving pattern such that no sector in the first respective group of logical data sectors on the first one of the two adjacent data tracks has more than one segment adjacent to segments of any single logical data sector in the second respective group of logical data sectors on the second one of the two adjacent data tracks.

In a first variant of that second instance, the controller may be configured to arrange the segments within the logical data sectors according to a segment interleaving pattern, wherein the segments are arranged in a first predetermined order in the first group of logical data sectors on the first one of the two adjacent data tracks, the segments are arranged in the first predetermined order in one physical sector on the second one of the two adjacent data tracks, and in each respective physical sector on the second one of the two adjacent data tracks, the segments are arranged in a respective order that is cyclically shifted from the respective order in an adjacent other respective physical sector on the second one of the two adjacent data tracks.

In that first variant of the second instance, each respective group of logical data sectors may include a same number of logical data sectors and may be distributed over the same number of physical data sectors on its respective one of the two adjacent data tracks.

In a second variant of the second instance, the first group of logical data sectors on the first one of the two adjacent data tracks may include a first number of logical data sectors, the second group of logical data sectors on the second one of the two adjacent data tracks may include a second number of logical data sectors, the second number being different from the first number and other than an integer multiple of the first number, in the first group of logical data sectors on the first one of the two adjacent data tracks, the segments may be arranged in a first predetermined order, and in the second group of logical data sectors on the second one of the two adjacent data tracks, the segments may be arranged in the first predetermined order.

In a third instance of the first implementation, all logical data sectors and all physical data sectors may be of a uniform sector size.

In a fourth instance of the first implementation, all physical data sectors may be of a uniform sector size. In a first variant of that fourth instance, all segments of each logical data sector may be of a uniform segment size. In a second variant of that fourth instance, at least one respective segment of each respective logical data sector may be of a different segment size than all other segments of the respective logical data sector.

In that second variant, the at least one respective segment of the different segment size may be in a uniform location in each respective logical data sector. Alternatively, in that second variant the at least one respective segment of the different segment size may be in a different location in each respective logical data sector.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 8 illustrates a mapping of segments for 17 sectors interleaved according to a first interleaver pattern;

FIG. 9 illustrates a mapping of segments for 17 sectors interleaved according to a second interleaver pattern;

FIG. 10 illustrates a mapping of segments for 16 sectors interleaved according to the third interleaver pattern;

FIG. 11 illustrates a mapping of segments for 16 sectors interleaved according to a fourth interleaver pattern.

DETAILED DESCRIPTION

Figure 1:
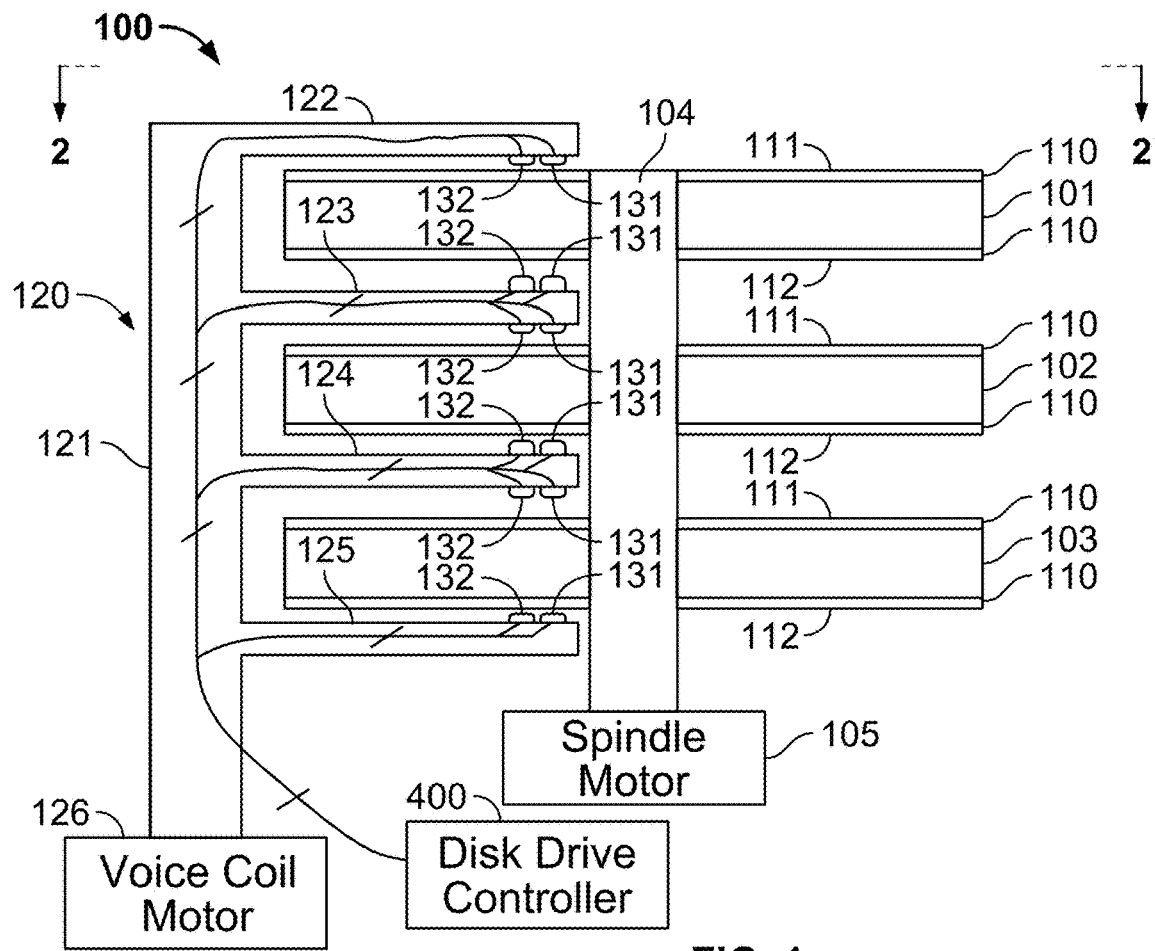
FIG. 1 is a vertical cross-sectional schematic view of a disk drive with which the subject matter of this disclosure may be used.
Figure 2:
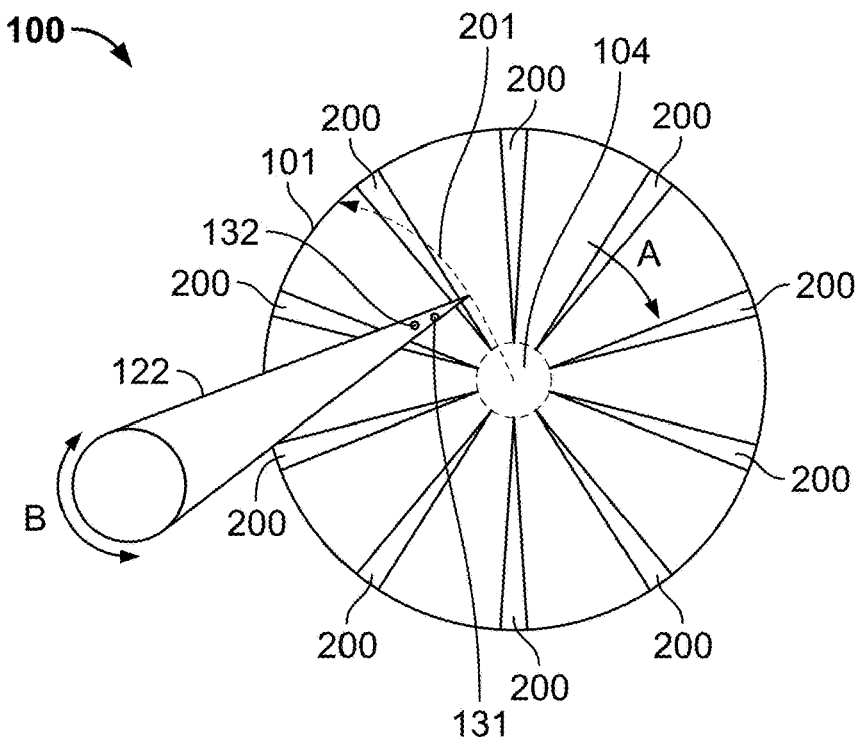
FIG. 2 is a plan view, taken from line 2-2 of FIG. 1, of a disk drive with which the subject matter of this disclosure may be used.

FIGS. 1 and 2 show an example of a disk drive 100 with which the subject matter of the present disclosure may be used. In this particular example, disk drive 100 has three platters 101, 102, 103, although any suitable number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes one or more actuators 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). It should be noted that FIGS. 1 and 2 are schematic only and not to scale. For example, the spindle diameter may be larger by comparison to the disk diameter.

A motor 126, commonly referred to as a "voice-coil motor," rotates actuator 121 back and forth along the directions of arrow B (FIG. 2) to move the heads 131, 132 along the path indicated by dashed arrow 201, although arms 122-125 normally cannot point directly at the center of the disk. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

In accordance with implementations of the subject matter of this disclosure, and as described in copending, commonly-assigned U.S. patent application Ser. No. 16/801,506, filed Feb. 26, 2020, logical sectors, also known as "codewords," may be interleaved across multiple physical sectors (e.g., on a single track) when storing data. Logical sectors are data sectors as received from a host device, which may contain a certain amount—typically 4 kB—of data. Physical sectors are angular portions of individual tracks on the surface of a disk platter. Physical sectors typically are sized so that one physical sector can store one logical sector's worth of data. Typically, all of the data stored in a physical sector may be from a single logical sector, but in above-incorporated application Ser. No. 16/801,506, the data from a single logical sector may be spread over multiple physical sectors, and this disclosure relates to particular ways in which that spreading may be performed.

Figure 3:
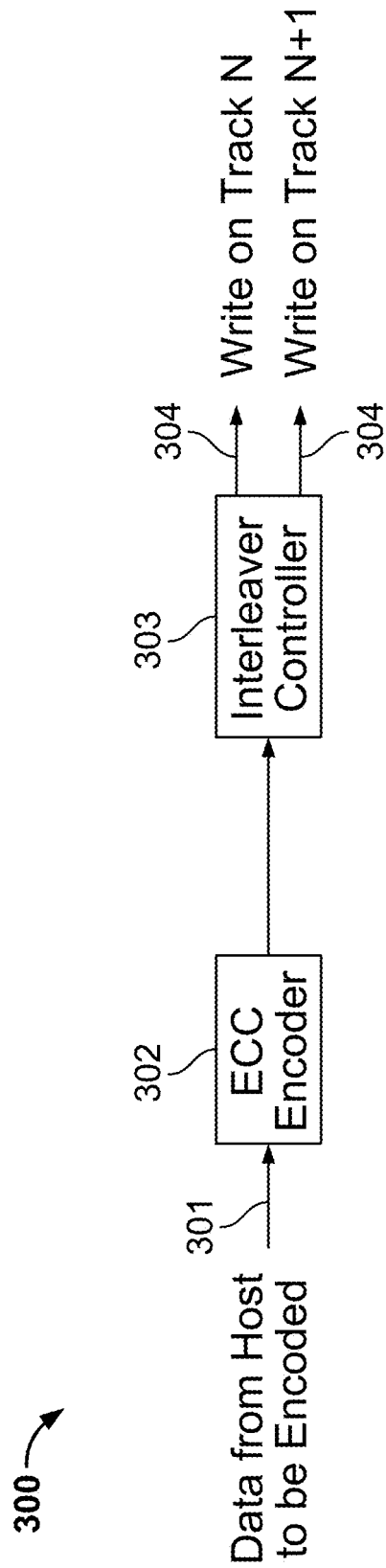
FIG. 3 shows a circuit arrangement for a write channel for encoding data according to embodiments of this disclosure.

FIG. 3 shows a circuit arrangement 300 in a write channel for encoding data according to embodiments of this disclosure. Incoming data 301 is encoded in encoder 302 using a suitable error correcting code (ECC), which may be a low-density parity check (LDPC) code. One class of ECC codes that may be used in accordance with some implementations is a non-binary LDPC code. However, it should be understood that other suitable ECCs such as Turbo Codes, Bose-Chaudhuri-Hocquenghem (BCH) codes, or Reed-Solomon codes, can be used.

The apportionment of data from a single logical sector or codeword into a plurality of physical sectors may be controlled by interleaver controller 303. Interleaver controller 303 may assign a different "segment" of a logical sector for writing at 304 to each physical sector on each of a plurality of contiguous or adjacent data tracks such as Track N or N+1.

As described above, as areal densities for magnetic data storage continue to increase, reading may be performed using read heads or sensors having dimensions comparable to the track width. As a result, a read head or sensor may detect data from two adjacent tracks. Therefore, it is important to be able to distinguish data on one track from data on another track, despite "inter-track interference."

There are known techniques for determining, and therefore factoring out, inter-track interference. However, it is better to reduce inter-track interference in the first place. In a system such as that described in the above-incorporated application Ser. No. 16/801,506, where a plurality of logical sectors are interleaved over a plurality of physical sectors along a single track, inter-track interference can be reduced further, using implementations of the subject matter of the present disclosure, by choosing interleaver patterns on contiguous or adjacent tracks to write segments of different sectors in different predetermined orders. The predetermined orders should be chosen to avoid a situation in which all segments of a first logical sector on a first track are adjacent all segments of second logical sector on a second, adjacent track. For better inter-track interference reduction, at most one segment of the first logical sector on the first track should be adjacent a segment of the second logical sector on the second track—i.e., each segment of the first logical sector on the first track should be adjacent a segment of a different other logical sector on the second track. However, in some implementations, it may be sufficient if more than one segment of the first logical sector on the first track is adjacent a segment of the second logical sector on the second track, as long as some (i.e., at least one) segments of the first logical sector are not adjacent to segments of the second logical sector on the second track—i.e., as long as at least one segment of the first logical sector on the first track is adjacent a segment of a third logical sector on the second track even while all other segments of the first logical sector on the first track may be adjacent segments of the second logical sector on the second track.

One way to achieve the latter result is to use, on a first track, a first pattern (which may be referred to as "Pattern A" or "Interleaver A") in which segments of a logical sector are written in their "natural" order—i.e., all of the first segments of all of the logical sectors being interleaved are written first, then all of the second segments are written second, etc. And on a second track adjacent the first track, a second pattern (which may be referred to as "Pattern B" or "Interleaver B") is used, which is cyclically shifted relative to the first pattern—i.e., after writing one segment from every logical sector into a first physical sector, segments of every logical sector are written into a second logical sector, but a segment of the second sector is written first, followed by segments of all of the other sectors in order, with a segment of the first sector coming last. For the third physical sector, a segment of the third sector would be written first with a segment of the second sector coming last, etc. As will be seen below, such a pattern meets the constraint that each segment of each logical sector on one track should be adjacent a segment of a different other logical sector on an adjacent track.

Because normally there are more than two tracks on the data storage medium, if two interleaver patterns are being used, those patterns will repeat on every additional pair of tracks. Thus, each particular track will have one of the two interleaver patterns on it, while both of the tracks on either side of the particular track will have the other one of the two interleaver patterns on it. Therefore, however the two tracks are selected, for each track the constraint relative to either of its adjacent tracks—i.e., that each segment of the first logical sector on a first track should be adjacent a segment of a different other logical sector on a second, adjacent track—will be met.

While the subject matter of this disclosure has thus far been described in terms of groupings of two tracks with two interleaver patterns or "types", there can be any number of interleaver types with groupings of a corresponding number of tracks—e.g., three types and groupings of three tracks, four types and groupings of four tracks, etc. However, the benefits of multiple interleaver types may diminish as the number of interleaver types approaches or exceeds the number of logical sectors interleaved on any track.

In many, but not all, implementations, the logical sectors are of uniform size—i.e., each logical sector is the same size as each other logical sector on a disk medium. On the other hand, each physical sector is a portion of a track of the disk medium, and track size varies with disk radius. Therefore, physical sector size, or alternatively the number of physical sectors on a track, may vary with disk radius. However, in many, but not all, implementations, each physical sector of the storage medium is the same size as each other physical sector of the storage medium, at least within a radial zone of the disk. It follows, then, that in many, but not all, implementations, the logical sectors are the same size as the media sectors.

The number of logical sectors interleaved according to any one interleaver pattern on a particular track may or may not be the same as the number of logical sectors interleaved according to an interleaver pattern on an adjacent track, because varying track size may result in different numbers of physical sectors on adjacent tracks. However, the number of segments into which any logical sector is to be divided normally would be the same in both (or all) patterns. These relationships are illustrated in the examples described below.

The interleaver patterns as described thus far specify an order in which sectors are represented. That is, instead of all segments of a first sector appearing first, followed by all segments of second sector, etc., successive segments come from different sectors. The interleaver pattern that is in use specifies from which sector each successive segment comes.

The interleaver pattern as described thus far specifies that a particular location is to be filled by a segment from a particular sector. The interleaver pattern as described thus far does not specify which particular segment, of the many segments in a sector, should appear in which particular location. That is, what has been described thus far has been a portion of the interleaver pattern which may be referred to as the "sector interleaving pattern." The interleaver pattern may also include a "segment interleaving pattern" as described below, and a complete description of any interleaver pattern would include both the sector interleaving pattern and the segment interleaving pattern.

Specifically, in an implementation where all segments of a sector were of the same uniform segment size, any segment order would work as long as the order were known. However, in another implementation a sector may not be evenly divided into segments. For example, in some implementations it may be necessary to divide the data in a sector only at symbol boundaries, and the number and sizes of symbols may vary depending on the nature of the data.

If some segments may be smaller or larger than other segments, as is implied by segments possibly being of different sizes, then in some cases, unless something is done to prevent it, it may by chance turn out that a large number of smaller segments from different logical sectors are selected for a single physical sector. The result could be that there would be unused capacity in such a physical sector. Conversely, there may be other physical sectors for which, by chance, a larger number of larger segments from different logical sectors are selected, containing more data than can be stored in a physical sector. Therefore, according to implementations of the subject matter of this disclosure, the interleaver pattern may include a segment pattern in which segments are selected using techniques that maintain, to the extent possible, uniform physical sector size. Such techniques may shuffle the order of segments within a logical sector. One shuffling pattern may be similar to the cyclic shifting of sectors in the sector pattern of the interleaver pattern as described above.

Sector patterns in interleaver patterns according to the subject matter of this disclosure may be better understood by reference to FIGS. 4-7.

Figure 4:
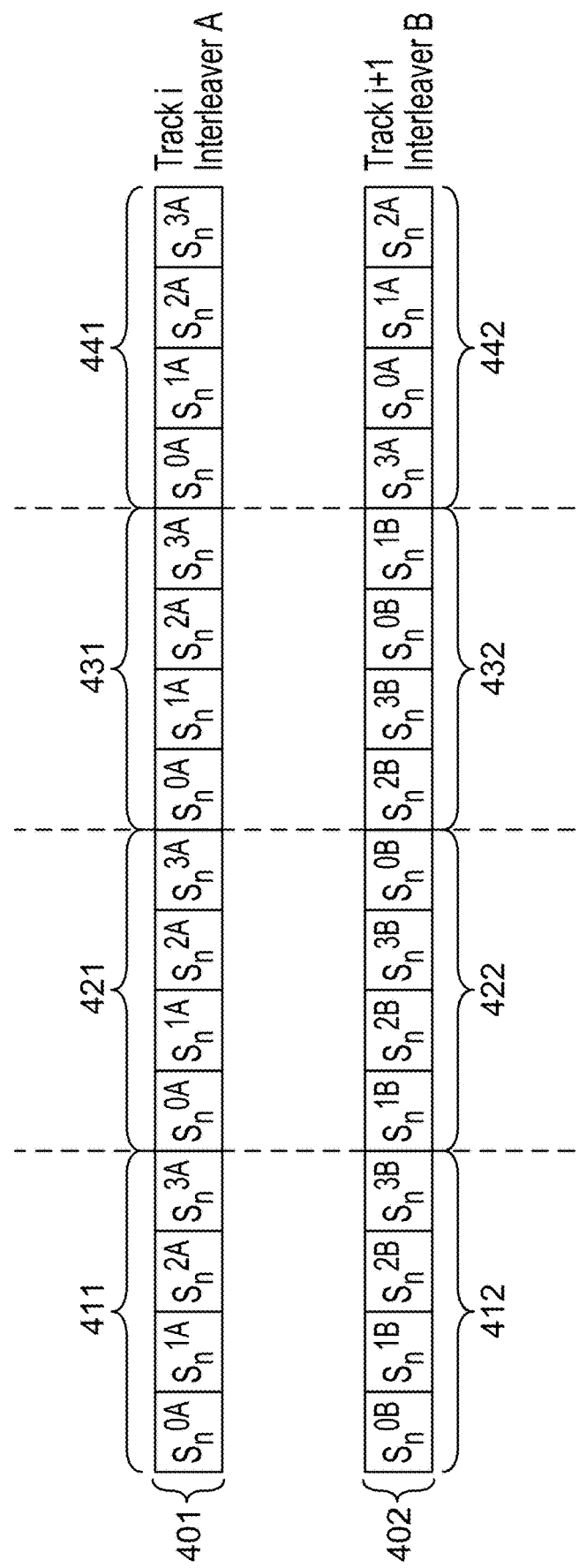
FIG. 4 is a diagram illustrating two interleaver patterns of four sectors including four segments each on two different tracks.

FIG. 4 is a diagram of a simple case of four sectors to be interleaved, with four segments per sector. In FIG. 4, individual segments are identified by the notation $s_n^m$, where m is the sector number and n is the segment number. That is, $s_n^m$ represents the nth segment of the mth sector. The superscript m may be followed by a letter indicating the particular interleaver pattern/track.

As seen in FIG. 4, segments are arranged on the ith track 401, using sector interleaving pattern "A" which is a "natural" pattern. That is, in each physical sector 411, 421, 431, 441, the segments are written in the natural order (0,1,2,3) of the four logical sectors from which they are drawn. On the (i+1)th track 402, sector interleaving pattern "B" includes a shift of one logical sector per physical sector relative to sector interleaving pattern "A." That is, in the first physical sector 412, the segments are written in the natural order (0,1,2,3) of the four logical sectors from which they are drawn. In the second physical sector 422, the logical sectors from which the written segments are drawn is cyclically shifted by '1' (1,2,3,0). In the third physical sector 432, the logical sectors from which the written segments are drawn is cyclically shifted by a further '1' (2,3,0,1). And in the fourth physical sector 442, the logical sectors from which the written segments are drawn is cyclically shifted by yet a further '1' (3,0,1,2).

While FIG. 4 shows (via the superscript as indicated above) the logical sector from which each segment is drawn, the particular segment (indicated by the subscript n) of the source sector is not specified. That is because the constraints set for the interleaver sector patterns is that the number of cases where adjacent segments on two adjacent tracks come from corresponding logical source sectors should be minimized, and that constraint does not specify, and is agnostic to, which segment of the source logical sectors are written to which physical sectors. Although there are other considerations, as discussed above and as illustrated below, that may determine segment selection, for the purpose of sector interleaving patterns, segment selection within sectors is unimportant. For that reason, the segment subscript remains n for all segments in FIG. 4. And for the same reason, the notation in FIGS. 5-7 is simplified to show neither s nor n, but only m.

Figure 5:
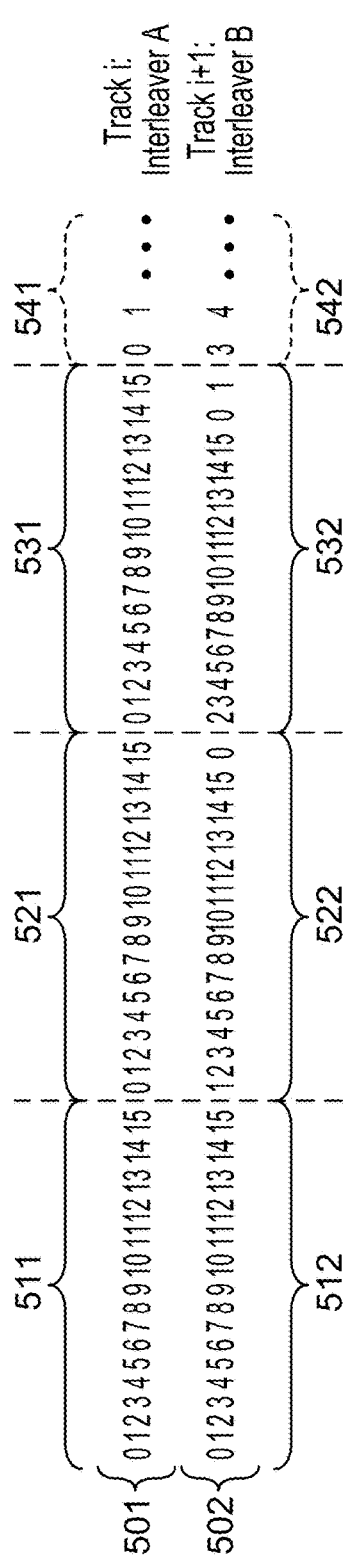
FIG. 5 is a diagram illustrating two interleaver patterns of 16 sectors including 16 segments each on two different tracks.

FIG. 5 shows a case similar to that of FIG. 4, where the number of segments per sector is the same as the number of sectors, but in this case that number is 16. Similarly to FIG. 4, segments are arranged on the ith track 501, using sector interleaving pattern "A" which is a "natural" pattern. That is, in each physical sector 511, 521, 531, 541, the segments are written in the natural order (0,1,2,3, . . . ,15) of the 16 logical sectors from which they are drawn. On the (i+1)th track 502, sector interleaving pattern "B" includes a shift of one logical sector per physical sector relative to sector interleaving pattern "A." That is, in the first physical sector 512, the segments are written in the natural order (0,1,2,3, . . . ,15) of the 16 logical sectors from which they are drawn. In the second physical sector 522, the logical sectors from which the written segments are drawn are cyclically shifted by '1' (1,2,3, . . . ,15,0). In the third physical sector 532, the logical sectors from which the written segments are drawn are cyclically shifted by a further '1' (2,3,4, . . . ,15,0,1). And in the fourth physical sector 542, the logical sectors from which the written segments are drawn area cyclically shifted by yet a further '1' (3,4,5, . . . ,15,0,1,2). There are 12 additional physical sectors (not shown) in which the logical sectors from which the written segments are drawn are cyclically shifted by yet a further '1' each.

Figure 6:
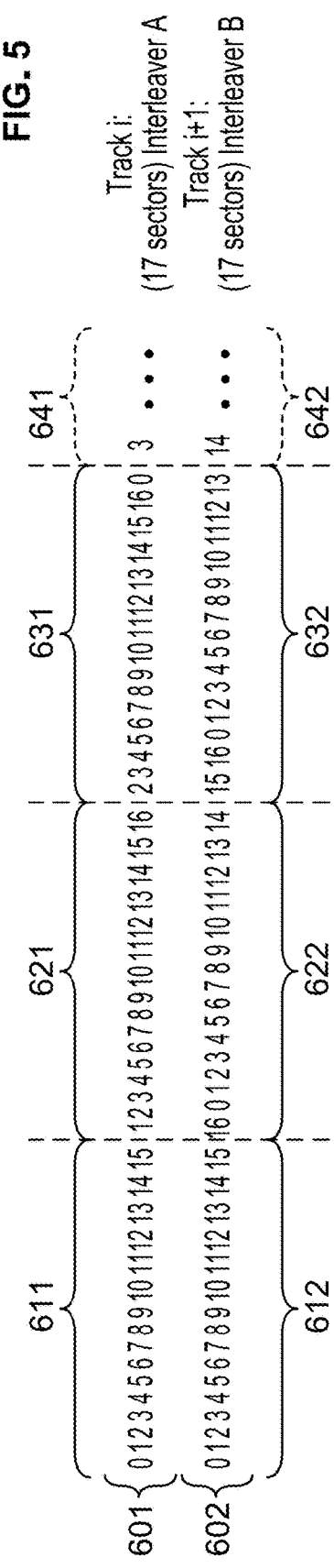
FIG. 6 is a diagram illustrating two interleaver patterns of 17 sectors including 16 segments each on two different tracks.
Figure 7:
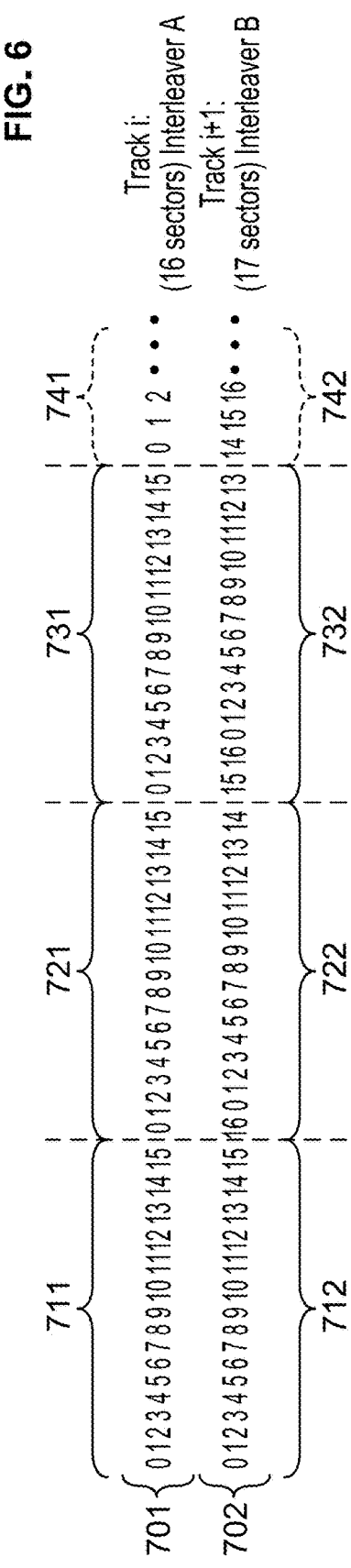
FIG. 7 is a diagram illustrating an interleaver pattern of 16 sectors including 16 segments each on one track, and an interleaver pattern of 17 sectors including 16 segments each on a different track.

The situation is somewhat different in FIG. 6, which shows a case where the number of sectors exceeds the number of segments per sector. In this case, the number of segments per sector is still 16 (because the physical sector size is unchanged), but the number of sectors in the sector pattern on each track is 17, as may be the case where the track is physically larger because it is radially further from the hub. Here, on the (i+1)th track 602, sector interleaving pattern "B" is a natural pattern, albeit one that extends across physical sector boundaries 603. Thus, in the first physical sector 612, the segments are written in the natural order (0,1,2,3, . . . ,15) of the first 16 of the 17 sectors from which the segments are drawn, but that leaves out a segment from the 17th one of the 17 sectors. Therefore, in the second physical sector 622, the natural sector order continues with a segment from the 17th sector and then 15 additional segments from the first 15 sectors (16,0,1, . . . ,14). The natural sector order continues in the third physical sector 632 (15,16,0,1, . . . ,12,13), and then the fourth physical sector 642 (14,15,16,0,1, . . . ,11,12), etc. Here, there are 13 additional physical sectors (not shown) in which the logical sectors from which the written segments are drawn are cyclically shifted by '1' each. Because there are only 16 segments per logical sector, after 17 16-segment physical sectors, all the segments in all 17 logical sectors are accounted for, even though in each physical sector, there is one logical sector from which no segment is drawn.

On the ith track 601, a cyclic shifting pattern of sectors is used. In the first physical sector 611, the segments are written in the natural sector order (0,1,2,3, . . . ,15) of the first 16 of the 17 sectors from which the segments are drawn. Again, that leaves out a segment from the $17^{th}$ one of the 17 sectors—sector 16. In the second physical sector 621, there is a cyclic shift, so that the first segment is from logical sector 1 and the segments are written in the order (1,2,3, . . . ,15,16), which leaves out a segment of sector 0. In the third physical sector 631, there is another cyclic shift, so that the first segment is from logical sector 2 and the segments are written in the order (2,3, . . . ,15,16,0), which leaves out a segment of sector 1. In the fourth physical sector 641, there is yet another cyclic shift, so that the first segment is from logical sector 3 and the segments are written in the order (3,4, . . . ,15,16,0,1), which leaves out a segment of sector 2. This sector pattern continues for 17 logical sectors in total, always starting, in each physical sector, with a segment from a logical sector following the logical sector at which the previous physical sector started. Because each physical sector includes only 16 segments, there is, in every physical sector, one logical sector that does not contribute a segment. However, because there are only 16 segments per logical sector, and 17 physical sectors are used, over the course of the 17 physical sectors, all segments of all logical sectors are accounted for.

FIG. 7 shows a case where the number of sectors in the sector pattern on one track is different from the number of sectors in the sector pattern on the other track. In this particular illustration of such a situation, the numbers of sectors in the respective sector patterns are 16 and 17. In this case, the respective sector interleaving patterns A and B on the ith and (i+1)th tracks 701, 702 are natural patterns. Because there are 16 sectors in the sector pattern on track 701, the pattern stays within the boundaries of physical sectors 711, 721, 731, 741, but on track 702, with 17 sectors in the sector pattern, the sector pattern crosses the boundaries of physical sectors 712, 722, 732, 742. Where the numbers of sectors in the two sector patterns are different, then as long as the number of sectors in the larger sector pattern is not an integer multiple of the number of sectors in the smaller sector pattern, the constraint—that the number of cases where adjacent segments on two adjacent tracks come from corresponding logical source sectors should be minimized—is met by the natural sector patterns. However, there may be other sector patterns that meet the constraints.

As discussed above, while the sector interleaving pattern, including any of the sector interleaving patterns in FIGS. 4-7, specifies that a particular location is to be filled by a segment from a particular sector, the sector interleaving pattern does not specify which particular segment, of the many segments in a sector, should appear in which particular location (although the segment pattern should be known to enable deinterleaving when the data is read). In an implementation where all segments of a sector were of the same size, any segment order, such as a natural segment order, would work as long as the order were known. However, in another implementation, a sector may not be evenly divided into segments. For example, in some implementations it may be necessary to divide the data in a sector only at symbol boundaries, and the number and sizes of symbols may vary depending on the nature of the data.

If some segments may be smaller than other segments, as is implied by segments possibly being of different sizes, then in some cases, unless something is done to prevent it, it may by chance turn out that a large number of smaller segments from different logical sectors are selected for a single physical sector. The result could be that there would be unused capacity in such a physical sector. Conversely, there may be other physical sectors for which, by chance, a larger number of larger segments from different logical sectors are selected, containing more data than can be stored in a physical sector. Therefore, according to implementations of the subject matter of this disclosure, segments are selected using a segment interleaving pattern that maintains, to the extent possible, uniform physical sector size. in such a segment interleaving pattern, the order of segments may be shuffled within a logical sector. One shuffling pattern of segments within a logical sector may be similar to the cyclic shifting of sectors within a sector interleaving pattern as described above.

Segment interleaving patterns that select segments from logical sectors in interleaver patterns according to the subject matter of this disclosure may be better understood by reference to FIGS. 8-11.

As noted above, although it is not an absolute requirement, it is desirable for all physical sectors to be of the same size. Similarly, logical sectors in a given system are typically all the same size, and therefore logical sector size and physical sector size are typically the same. However, as noted above, within a sector, it may be that not all segments are the same size.

If not all segments are the same size, it follows that there are at least two different segment sizes among the segments in a given sector. In some implementations, one can assume that there are two different segment lengths, and only one segment is shorter or longer than all other segments. The one segment that is shorter or longer than all other segments may be referred to as a "special" segment, with the understanding that the term "special" is notational only, to designate its size, and there is no particular increased importance to the "special" segment. Indeed, the special segment can assume the same size as the other segments when the sector size is divisible by the number of segments.

In some implementations, there may be 16 segments per sector, as described above. Symbol size may commonly be 12 bits. In one implementation, the sector size may be 3,233 symbols, divided into 15 segments each of which includes 203 symbols, plus one special segment which includes 188 symbols (i.e., the special segment is 15 symbols shorter than each of the other segments). In another implementation, where the special segment is allowed to be longer than the other segments, the sector size may be 3,240 symbols, divided into 15 segments each of which includes 202 symbols, plus one special segment which includes 210 symbols (i.e., the special segment is eight symbols longer than each of the other segments).

Each of FIGS. 8-11 includes two halves of an interleaver pattern. The left half of each drawing represents the sector interleaving pattern showing the distribution of source logical sectors for the constituent segments of each physical sector (also known as a "media codeword" (CW)), with each row representing one physical sector, and each row position representing a source logical sector for a segment of the physical sector occupying the corresponding position in the physical sector. The right half of each drawing represents the segment interleaving pattern showing which segment of the corresponding logical sector appears in the corresponding position of the physical sector represented on the left half of the same row (each half of each row has the same number of positions).

Figure 8:
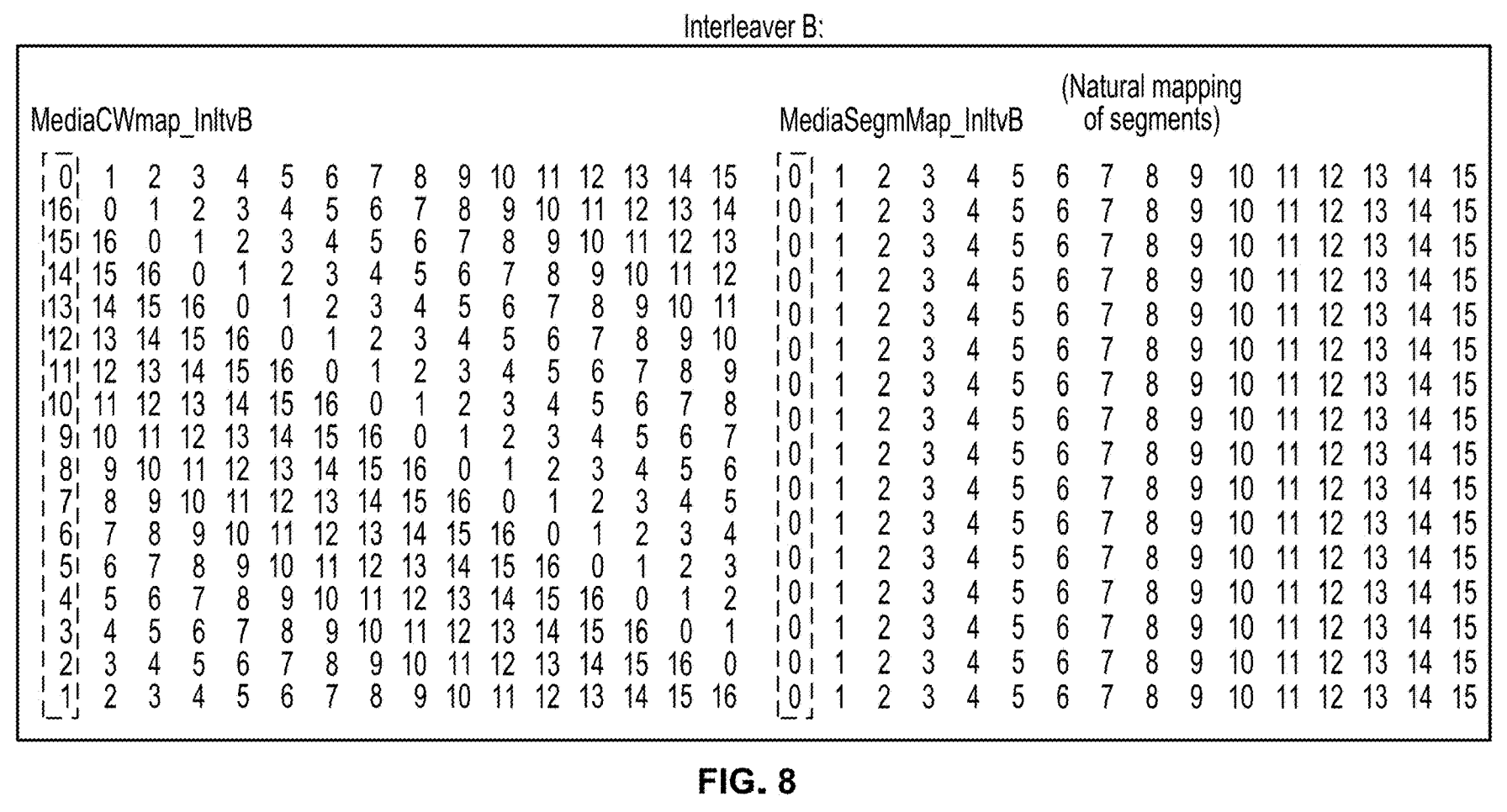

Taking FIG. 8 as an example (the specific significance of FIG. 8 will be discussed in the next paragraph), the fourth entry in the left half of the eighth row is "13," meaning that the fourth segment in the eighth physical sector comes from the $14^{th}$ logical sector (m=13). The fourth entry in the right half of the eight row is "3," meaning that the fourth segment in the eighth physical sector is the fourth segment (n=3) of the source logical sector—i.e., the fourth segment of the $14^{th}$ logical sector.

Figure 9:
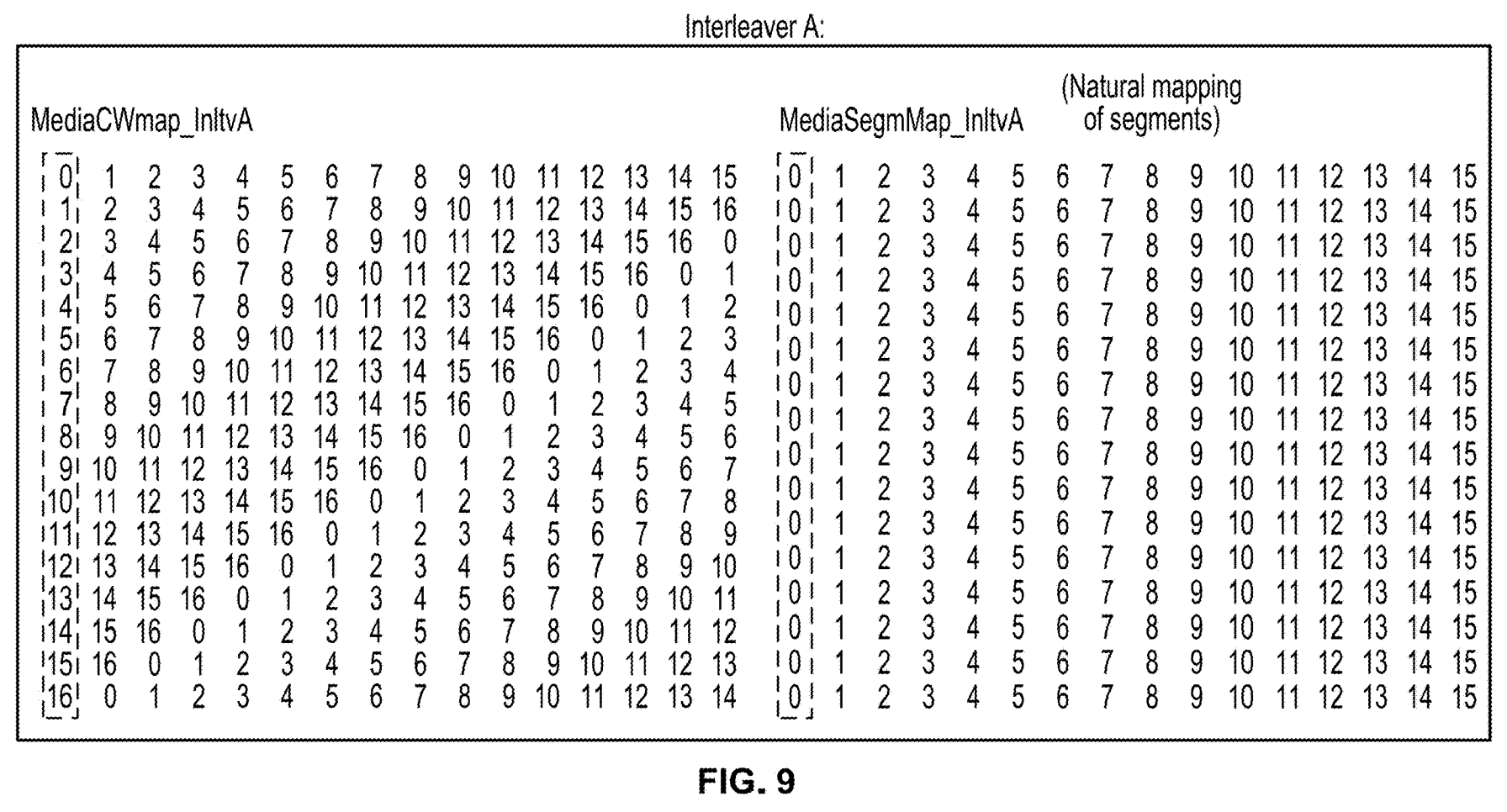

FIGS. 8 and 9 represent the case where the number of source logical sectors is 17, with FIG. 8 showing the segment distribution where the sectors are interleaved using Sector Interleaver B (natural order), while FIG. 9 shows the segment distribution where the sectors are interleaved using Sector Interleaver A (cyclically shifted order). As can be seen, it turns out that in the case of 17 source logical sectors, uniform physical sector size may be achieved with a segment interleaving pattern that is a natural mapping of segments, regardless of the sector interleaving pattern.

Figure 10:
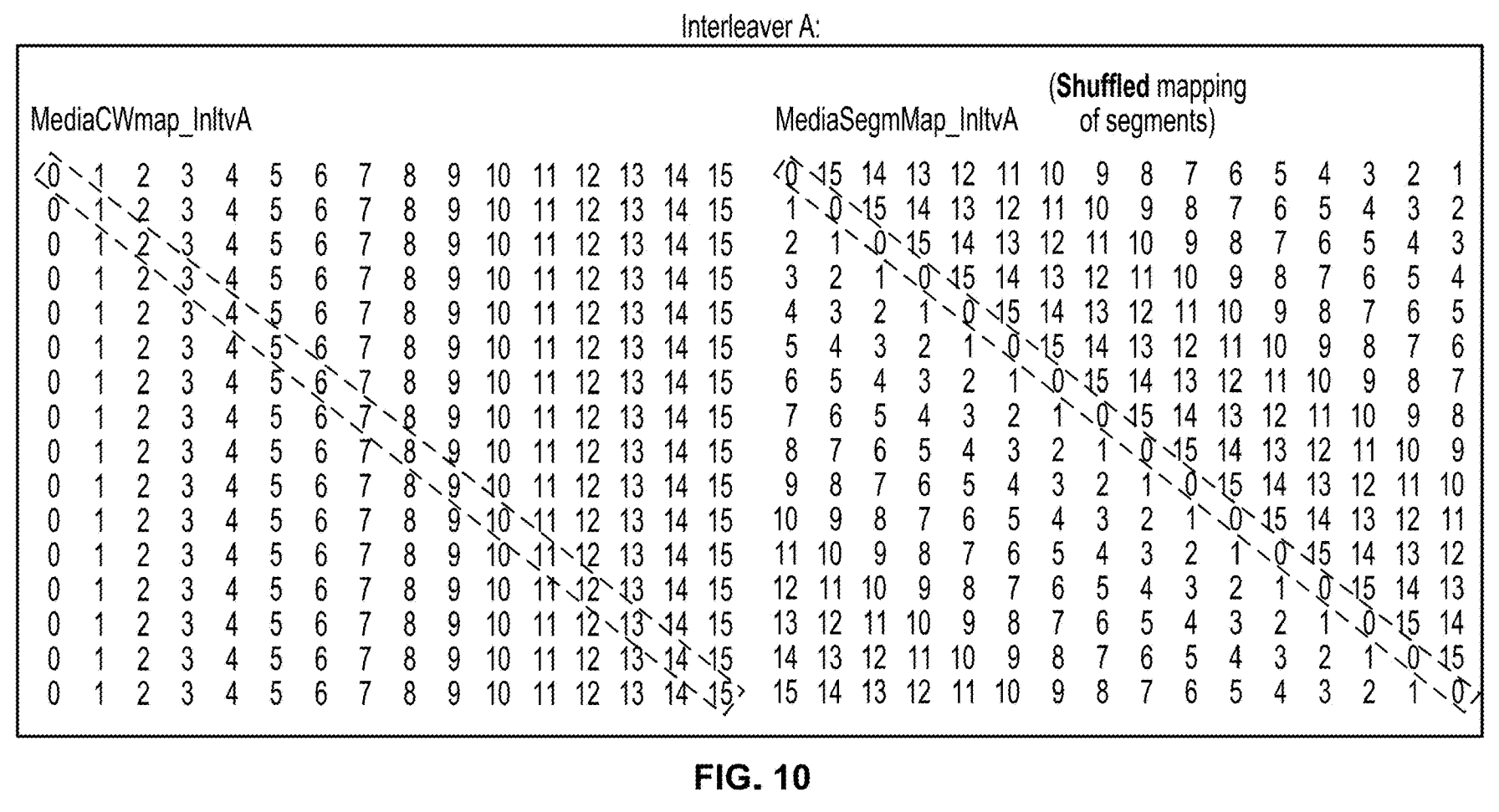
Figure 11:
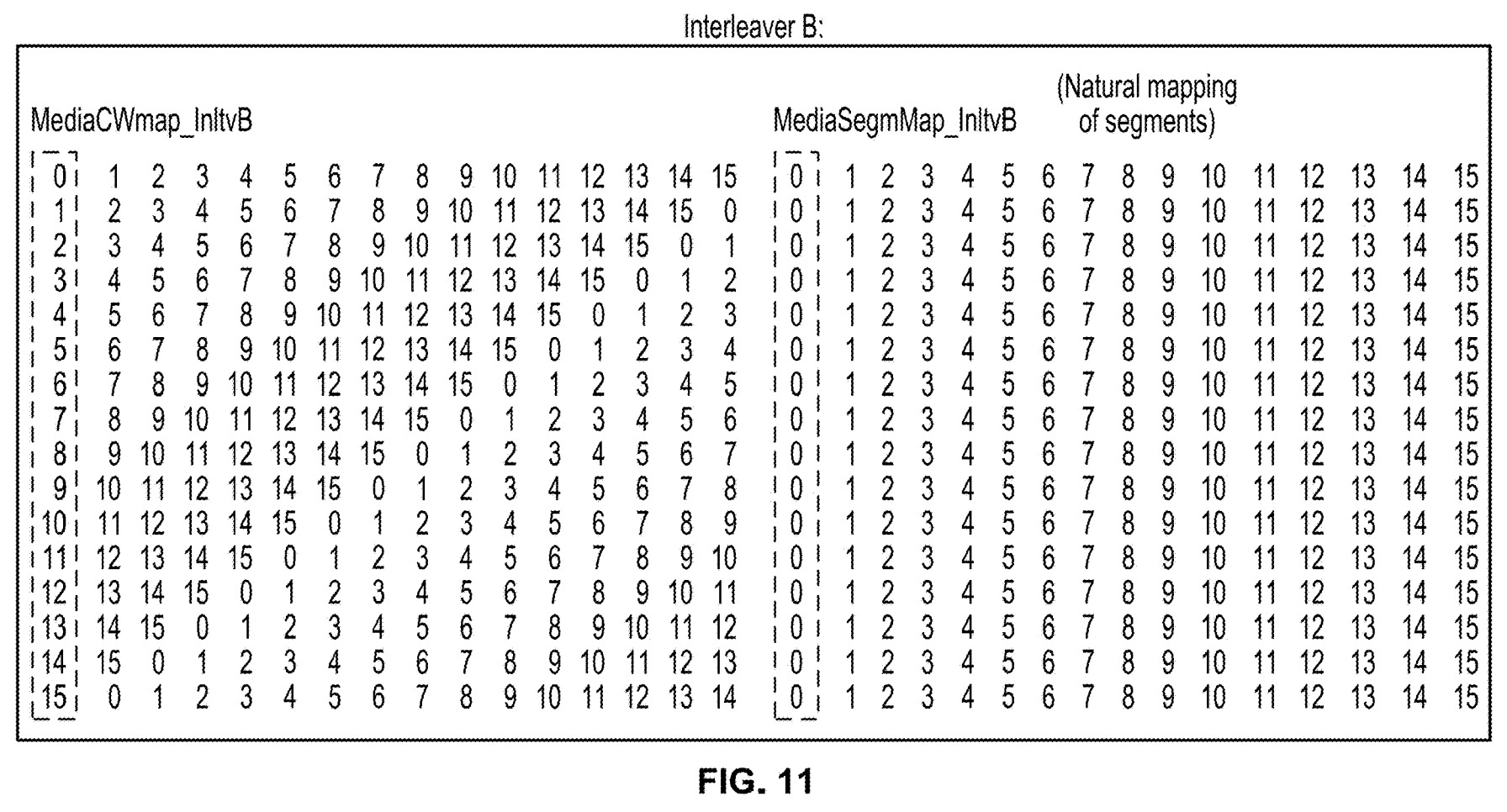

FIGS. 10 and 11 represent the case where the number of source logical sectors is 16, with FIG. 10 showing the segment distribution where the sectors are interleaved using Sector Interleaver A (natural order), while FIG. 11 shows the segment distribution where the sectors are interleaved using Sector Interleaver B (cyclically shifted order). As can be seen in FIG. 11, in the case of 16 source logical sectors, uniform physical sector size may be achieved with a segment interleaving pattern that is a natural mapping of segments (where the "special" segment is always in the same location in each sector) for the cyclically shifted sector interleaving pattern (Sector Interleaver B).

However, to achieve uniform physical sector size with a natural mapping sector interleaving pattern of 16 sectors (Sector Interleaver A), a segment interleaving pattern using a "shuffled" segment mapping (where the "special" segment is in a different location in each sector) as shown in FIG. 10 could be used. In the shuffled mapping of the segment interleaving pattern that is shown in FIG. 10, where the special segment is the first segment (n=0) of each logical sector, the segments are stored physically in decreasing order of n with an anticyclic shift. That is, for sector m=0, the segment n=0 appears first, and then the remaining segments appear in the order 15,14,13, . . . ,1. For sector m=1, the segment n=0 appears second, with segment n=1 appearing first, and then the remaining segments appear in the order n=15,14,13, . . . ,2, and so on until in for sector m=14, the segment n=0 appears in the 15$^{th}$ position, with segments n=14,13,12, . . . ,1 appearing first, and finally segment n=15 appears last, and for sector m=15, the segment n=0 appears last, with segments n=15,14,13, . . . ,1 appearing first. This pattern results in a diagonal placement of the "special" segment when mapped as in FIG. 10.

The implementations shown in FIGS. 8-11 are merely illustrations. Segment interleaving patterns based on other mappings may also fit the constraint that all physical sectors be the same size. In particular, in the shuffled mapping of the segment interleaving pattern shown in FIG. 10, only the shuffled position of the "special" segment (n=0) matters, at least for the constraint that all physical sectors be the same size, and as far as that constraint is concerned the other segments can be distributed in any order as long as the order is known (although there may be other constraints or considerations that affect what order is used).

There may be other segment interleaving patterns with completely different mappings of the special segment that fit the constraint that all physical sectors be the same size. For example, whereas in the segment mapping of FIG. 10, the diagonal placement of the special segment advances from the upper left to the lower right, in another possible segment mapping (not shown) the diagonal placement of the special segment advances from the lower left to the upper right (i.e., the special segment n=0 appears last for sector m=0 and appears first for sector m=15).

In still another possible segment mapping (not shown), for each sector, all of the odd-numbered segments may be grouped together and all of the even-numbered segments may be grouped together. As this segment mapping is shuffled, for successive sectors, the odd-numbered segments may appear before or after the even-numbered segments. The result may be that the special segment appears on two separate diagonals of two halves of the segment map, with one diagonal occupying successive positions in alternate odd-numbered rows in one half of the segment map and the other diagonal occupying successive positions in alternate even-numbered rows in the other half of the segment maps.

There may be still other segment mapping patterns.

In addition, the various sector interleaving patterns and segment interleaving patterns can be combined on a track-by-track basis. And as previously noted, the number of interleavers, and therefore the number of tracks that are grouped together, can be greater than two.

Figure 12:
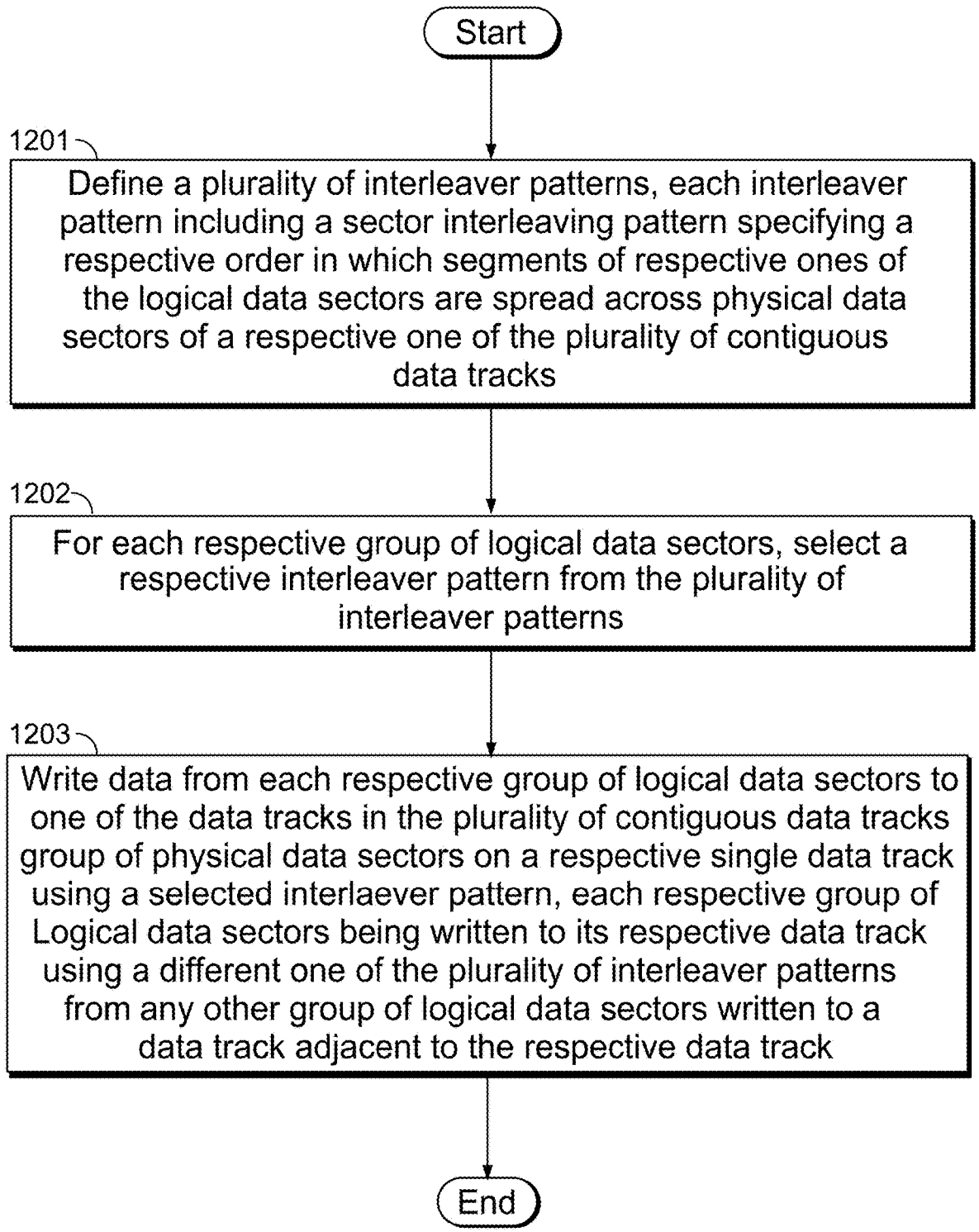
FIG. 12 is a flow diagram illustrating a method according to implementations of the subject matter of this disclosure.

A method 1200 according to implementations of the subject matter of this disclosure, according to which interleaver controller 303 may assign a different "segment" of a logical sector to each physical sector, is diagrammed in FIG. 12.

Method 1200 begins at 1201 where a plurality of interleaver patterns is defined, each interleaver pattern including a sector interleaving pattern specifying a respective order in which segments of respective ones of the logical data sectors are spread across physical data sectors of a respective one of the plurality of contiguous data tracks.

Next, at 1202, for each respective group of logical data sectors, a respective interleaver pattern is selected from the plurality of interleaver patterns.

At 1203, data from each respective group of logical data sectors is written to one of the data tracks in the plurality of contiguous data tracks using the selected interleaver pattern, each respective group of logical data sectors being written to its respective data track using a different one of the plurality of interleaver patterns from any other group of logical data sectors written to a data track adjacent to the respective data track. In some implementations, no segments of a particular logical sector are distributed in such a way that all of the segments to which they are adjacent on another track are from a same logical sector on that other track. In a particular implementation, all segments of the particular logical sector on one track are adjacent to segments that come from logical sectors on the other track that are different from each other.

Thus it is seen that a method and apparatus for writing data to a storage medium, using different interleaving patterns on adjacent tracks to minimize inter-track interference, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of storing data in a plurality of groups of logical data sectors, each respective group of logical data sectors including a respective number of logical data sectors, across a plurality of contiguous data tracks of a data storage medium, the method comprising:
   defining a plurality of interleaver patterns, each interleaver pattern including a sector interleaving pattern specifying a respective order in which segments of respective ones of the logical data sectors are spread across physical data sectors of a respective one of the plurality of contiguous data tracks;
   selecting, for each respective group of logical data sectors, a respective interleaver pattern from the plurality of interleaver patterns; and
   writing data from each respective group of logical data sectors to one of the data tracks in the plurality of contiguous data tracks using the selected respective interleaver pattern, each respective group of logical data sectors being written to its respective data track using a different one of the plurality of interleaver patterns from any other group of logical data sectors written to a data track adjacent to the respective data track.

2. The method of claim 1 wherein:
   the selecting a respective interleaver pattern comprises selecting a respective sector interleaving pattern for each respective group of logical data sectors so that for any two respective groups of logical data sectors stored on two adjacent data tracks, each logical data sector on a first one of the two adjacent data tracks has (1) at least a first segment that is adjacent a segment of a first logical sector on a second one of the two adjacent data tracks and (2) at least a second segment that is adjacent a segment of a second logical sector on the second one of the two adjacent data tracks; and
   the writing comprises distributing the respective number of logical data sectors in each respective group of logical data sectors across a respective group of physical data sectors on a respective single data track of the data storage medium.

3. The method of claim 2 wherein, when a number of segments per sector is equal to the respective number of logical data sectors, the distributing comprises:
for each respective group of logical data sectors, distributing each segment of each logical data sector into a physical data sector of the respective single data track according to the selected sector interleaving pattern, each physical data sector receiving at most one segment from each logical data sector.

4. The method of claim 2 wherein in the selecting, no sector in the first respective group of logical data sectors on the first one of the two adjacent data tracks has more than one segment adjacent to segments of any single logical data sector in the second respective group of logical data sectors on the second one of the two adjacent data tracks.

5. The method of claim 4 wherein:
segments are arranged within the logical data sectors according to a segment interleaving pattern; wherein:
in the first group of logical data sectors on the first one of the two adjacent data tracks, the segments are arranged in a first predetermined order;
in one physical sector on the second one of the two adjacent data tracks, the segments are arranged in the first predetermined order; and
in each respective physical sector on the second one of the two adjacent data tracks, the segments are arranged in a respective order that is cyclically shifted from the respective order in an adjacent other respective physical sector on the second one of the two adjacent data tracks.

6. The method of claim 5 wherein the first predetermined order is natural order of the logical data sectors.

7. The method of claim 5 wherein
each respective group of logical data sectors includes a same number of logical data sectors and is distributed over the same number of physical data sectors on its respective one of the two adjacent data tracks.

8. The method of claim 4 wherein:
the first group of logical data sectors on the first one of the two adjacent data tracks includes a first number of logical data sectors;
the second group of logical data sectors on the second one of the two adjacent data tracks includes a second number of logical data sectors, the second number being different from the first number and other than an integer multiple of the first number;
in the first group of logical data sectors on the first one of the two adjacent data tracks, the segments are arranged in a first predetermined order; and
in the second group of logical data sectors on the second one of the two adjacent data tracks, the segments are arranged in the first predetermined order.

9. The method of claim 8 wherein the first predetermined order is natural order.

10. The method of claim 2 wherein all logical data sectors and all physical data sectors are of a uniform sector size.

11. The method of claim 2 wherein all physical data sectors are of a uniform sector size.

12. The method of claim 11 wherein all segments of each logical data sector are of a uniform segment size.

13. The method of claim 11 wherein at least one respective segment of each respective logical data sector is of a different segment size than all other segments of the respective logical data sector.

14. The method of claim 13 wherein the at least one respective segment of the different segment size is in a uniform location in each respective logical data sector.

15. The method of claim 13 wherein the at least one respective segment of the different segment size is in a different location in each respective logical data sector.

16. A data storage device comprising:
a data storage medium; and
a controller configured to store data in a plurality of groups of logical data sectors, each respective group of logical data sectors including a respective number of logical data sectors, across a plurality of contiguous data tracks of the data storage medium, by:
defining a plurality of interleaver patterns, each interleaver pattern including a sector interleaving pattern specifying a respective order in which segments of respective ones of the logical data sectors are spread across physical data sectors of a respective one of the plurality of contiguous data tracks;
selecting, for each respective group of logical data sectors, a respective interleaver pattern from the plurality of interleaver patterns; and
writing data from each respective group of logical data sectors to one of the data tracks in the plurality of contiguous data tracks using the selected interleaver pattern, each respective group of logical data sectors being written to its respective data track using a different one of the plurality of interleaver patterns from any other group of logical data sectors written to a data track adjacent to the respective data track.

17. The data storage device of claim 16 wherein the controller is configured to:
select a respective interleaving pattern for each respective group of logical data sectors so that for any two respective groups of logical data sectors stored on two adjacent data tracks, each logical data sector on a first one of the two adjacent data tracks has (1) at least a first segment that is adjacent a segment of a first logical sector on a second one of the two adjacent data tracks and (2) at least a second segment that is adjacent a segment of a second logical sector on the second one of the two adjacent data tracks; and
distribute the respective number of logical data sectors in each respective group of logical data sectors across a respective group of physical data sectors on a respective single data track of the data storage medium.

18. The data storage device of claim 17 wherein, when a number of segments per sector is equal to the respective number of logical data sectors, the controller is configured to, for each respective group of logical data sectors, distribute each segment of each logical data sector into a physical data sector of the respective single data track according to the selected interleaving pattern, each physical data sector receiving at most one segment from each logical data sector.

19. The data storage device of claim 17 wherein the controller is configured to select the respective interleaving pattern such that no sector in the first respective group of logical data sectors on the first one of the two adjacent data tracks has more than one segment adjacent to segments of any single logical data sector in the second respective group of logical data sectors on the second one of the two adjacent data tracks.

20. The data storage device of claim 19 wherein the controller is configured to arrange the segments within the logical data sectors according to a segment interleaving pattern; wherein:
the segments are arranged in a first predetermined order in the first group of logical data sectors on the first one of the two adjacent data tracks;

the segments are arranged in the first predetermined order in one physical sector on the second one of the two adjacent data tracks; and in each respective physical sector on the second one of the two adjacent data tracks, the segments are arranged in a respective order that is cyclically shifted from the respective order in an adjacent other respective physical sector on the second one of the two adjacent data tracks.

21. The data storage device of claim 20 wherein each respective group of logical data sectors includes a same number of logical data sectors and is distributed over the same number of physical data sectors on its respective one of the two adjacent data tracks.

22. The data storage device of claim 19 wherein:

the first group of logical data sectors on the first one of the two adjacent data tracks includes a first number of logical data sectors;

the second group of logical data sectors on the second one of the two adjacent data tracks includes a second number of logical data sectors, the second number being different from the first number and other than an integer multiple of the first number;

in the first group of logical data sectors on the first one of the two adjacent data tracks, the segments are arranged in a first predetermined order; and in the second group of logical data sectors on the second one of the two adjacent data tracks, the segments are arranged in the first predetermined order.

23. The data storage device of claim 17 wherein all logical data sectors and all physical data sectors are of a uniform sector size.

24. The data storage device of claim 17 wherein all physical data sectors are of a uniform sector size.

25. The data storage device of claim 24 wherein all segments of each logical data sector are of a uniform segment size.

26. The data storage device of claim 24 wherein at least one respective segment of each respective logical data sector is of a different segment size than all other segments of the respective logical data sector.

27. The data storage device of claim 26 wherein the at least one respective segment of the different segment size is in a uniform location in each respective logical data sector.

28. The data storage device of claim 26 wherein the at least one respective segment of the different segment size is in a different location in each respective logical data sector.

* * * * *